United States Patent
Tanaka

(10) Patent No.: US 12,033,808 B2
(45) Date of Patent: Jul. 9, 2024

(54) ELECTROLYTIC CAPACITOR AND METHOD FOR MANUFACTURING ELECTROLYTIC CAPACITOR

(71) Applicant: Murata Manufacturing Co., Ltd., Nagaokakyo (JP)

(72) Inventor: Yasuo Tanaka, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 125 days.

(21) Appl. No.: 17/957,078

(22) Filed: Sep. 30, 2022

(65) Prior Publication Data
US 2023/0028493 A1  Jan. 26, 2023

Related U.S. Application Data

(63) Continuation of application No. PCT/JP2021/012592, filed on Mar. 25, 2021.

(30) Foreign Application Priority Data

Apr. 14, 2020 (JP) ................................ 2020-072371

(51) Int. Cl.
*H01G 9/012* (2006.01)
*H01G 9/00* (2006.01)
*H01G 9/048* (2006.01)
*H01G 9/10* (2006.01)

(52) U.S. Cl.
CPC .......... *H01G 9/012* (2013.01); *H01G 9/0029* (2013.01); *H01G 9/048* (2013.01); *H01G 9/10* (2013.01)

(58) Field of Classification Search
None
See application file for complete search history.

(56) References Cited

U.S. PATENT DOCUMENTS

| 2002/0001169 A1 | 1/2002 | Shiraishi et al. |
| 2008/0106855 A1 | 5/2008 | Utashito |
| 2016/0071654 A1 | 3/2016 | Kimura et al. |

FOREIGN PATENT DOCUMENTS

| JP | 2002319522 A | 10/2002 |
| JP | 3424247 B2 | 7/2003 |
| JP | 2009302283 A | 12/2009 |
| JP | 2010080644 A * | 4/2010 |
| JP | 5131079 B2 | 1/2013 |
| WO | 2007004505 A1 | 1/2007 |
| WO | 2014188833 A1 | 11/2014 |

OTHER PUBLICATIONS

International Search Report in PCT/JP2021/012592, mailed Jun. 22, 2021, 3 pages.

* cited by examiner

*Primary Examiner* — Eric W Thomas
(74) *Attorney, Agent, or Firm* — ArentFox Schiff LLP

(57) ABSTRACT

An electrolytic capacitor that includes a stack having multiple capacitor elements stacked in a thickness direction perpendicular to a length direction, wherein a first end of a first cathode is first closest to a second external electrode among all of ends of the cathodes of the multiple capacitor elements, a second end of a second cathode is second closest to the second external electrode, and an end of the second external electrode is closer to a first external electrode than the second end of the second cathode.

18 Claims, 5 Drawing Sheets

ELECTROLYTIC CAPACITOR AND METHOD FOR MANUFACTURING ELECTROLYTIC CAPACITOR

CROSS REFERENCE TO RELATED APPLICATIONS

The present application is a continuation of International application No. PCT/JP2021/012592, filed Mar. 25, 2021, which claims priority to Japanese Patent Application No. 2020-072371, filed Apr. 14, 2020, the entire contents of each of which are incorporated herein by reference.

FIELD OF THE INVENTION

The present invention relates to an electrolytic capacitor and a method of producing an electrolytic capacitor.

BACKGROUND OF THE INVENTION

An electrolytic capacitor such as a solid electrolytic capacitor is produced by, for example, forming a dielectric layer on a surface of an anode made of a valve-action metal and subsequently forming a cathode opposite to the anode via the dielectric layer.

For example, Patent Literature 1 discloses a method of producing a solid electrolytic capacitor including a capacitor element that includes a cathode electrode portion and an anode electrode portion made of a valve-action metal, an exterior made of an insulating resin and covering the capacitor element with an end surface of the anode electrode portion exposed, an underlying electrode on the end surface of the anode electrode portion and the insulating resin, and an external electrode on the underlying electrode. In this method, particles of a non-valve-action metal are caused to collide with an end surface of the exterior at a collision speed of 200 m/s to 350 m/s (both inclusive) by a cold spray method to form the underlying electrode and to form a diffusion layer made of the non-valve-action metal and the valve-action metal on the end surface of the anode electrode portion.

Patent Literature 2 discloses a solid electrolytic capacitor in which capacitor elements each including an anode body divided into an insulating portion covered by an insulating film and a capacitance generating portion including an oxide film layer at a surface of the anode body, a solid electrolyte layer on the oxide film layer, and a conductive layer on the solid electrolyte layer are stacked; the capacitor elements are bonded by applying an insulating adhesive to the insulating portion of each capacitor element and applying a conductive adhesive to the conductive layer of the capacitance generating portion of each capacitor element; the stack of the capacitor elements is cut at the insulating portions in a width direction to expose the anode bodies; and a conductive layer is formed on each exposed anode body.

Patent Literature 1: JP 5131079 B
Patent Literature 2: JP 3424247 B

SUMMARY OF THE INVENTION

Some electrolytic capacitors such as solid electrolytic capacitors have structures in which multiple capacitor elements are stacked. In such a multilayer electrolytic capacitor, the connection resistance between each capacitor element and an external electrode affects the equivalent series resistance (ESR). Thus, preferably, a cathode defining each capacitor element is directly connected to the external electrode. However, in the case of a multilayer electrolytic capacitor, ends of the cathodes are sometimes displaced at an end surface of the stack of the capacitor elements due to factors such as displacement of the capacitor elements during stacking and variation in cathode thickness. Usually, the stack is sealed by a sealing resin before forming an external electrode connected to the cathodes. When the ends of the cathodes are displaced at the end surface of the stack of the capacitor elements during sealing, the area of the cathodes exposed from the sealing resin tends to be small. Formation of the external electrode in such a state results in a high ESR due to a small contact area between the cathodes and the external electrode or contact failure between the cathodes and the external electrode. In other words, in conventional electrolytic capacitors, the ESR cannot be reduced when the ends of the cathodes are displaced at the end surface of the stack of the capacitor elements.

The present invention was made to solve the above issue and aims to provide an electrolytic capacitor with a low ESR even when the ends of the cathodes are displaced at the end surface of the stack of the capacitor elements. The present invention also aims to provide a method of producing the electrolytic capacitor.

An electrolytic capacitor of the present invention includes: a stack defining a first end surface and a second end surface opposite to each other in a length direction and including multiple capacitor elements stacked in a thickness direction perpendicular to the length direction, each capacitor element of the multiple capacitor elements including an anode having a porous portion at a surface thereof and exposed at the first end surface of the stack, a dielectric layer on a surface of the porous portion, and a cathode opposite to the anode via the dielectric layer and exposed at the second end surface of the stack, the multiple capacitor elements including one or more first capacitor elements each including a first cathode and one or more second capacitor elements each including a second cathode; a first external electrode on the first end surface and electrically connected to the anode of at least one capacitor element of the multiple capacitor elements; and a second external electrode on the second end surface and electrically connected to at least the first cathode and the second cathode, wherein a first end of the first cathode that is closer to the second end surface is displaced from a second end of the second cathode that is closer to the second end surface in the length direction, the first end of the first cathode is first closest to the second external electrode in the length direction among all of ends of the cathodes of the multiple capacitor elements in the stack on sides thereof closer to the second end surface, the second end of the second cathode is second closest to the second external electrode in the length direction among the all of the ends of the cathodes of the multiple capacitor elements in the stack on the sides thereof closer to the second end surface, and in the length direction, an end of the second external electrode closer to the first external electrode is closer to the first external electrode than the second end of the second cathode.

A method of producing an electrolytic capacitor includes: forming a stack defining a first end surface and a second end surface opposite to each other in a length direction and including multiple capacitor elements stacked in a thickness direction perpendicular to the length direction, each capacitor element of the multiple capacitor elements including an anode having a porous portion at a surface thereof, a dielectric layer on a surface of the porous portion, and a cathode opposite to the anode via the dielectric layer, wherein the multiple capacitor elements include a first capacitor element including a first cathode having a first end that is first closest to the second end surface and is first furthest from the first end surface in the length direction among all of ends of the cathodes of the multiple capacitor elements on sides thereof closer to the second end surface, and a second capacitor element including a second cathode having a second end that is second closest to the second end surface on a side thereof closer to the second end surface in the length direction and is second furthest from the first end surface in the length direction among the all of the ends of the cathodes of the multiple capacitor elements on the sides thereof closer to the second end surface; forming a first electrode layer on the second end surface of the stack such that the first electrode layer is connected to the first cathode and the second cathode; forming a sealed body such that the anodes of the multiple capacitor elements are exposed at one end surface in the length direction of the sealed body and the first electrode layer is exposed at the other end surface in the length direction thereof by sealing the stack and the first electrode layer with a sealing resin; forming a first external electrode on the one end surface of the sealed body and connected to the anode of at least one capacitor element of the multiple capacitor elements; and forming a second electrode layer on the other end surface of the sealed body and connected to the first electrode layer to form a second external electrode.

The present invention can provide an electrolytic capacitor with a low ESR even when the ends of the cathodes are displaced at the end surface of the stack of the capacitor elements. The present invention can also provide a method of producing the electrolytic capacitor.

DETAILED DESCRIPTION OF THE PREFERRED EMBODIMENTS

Figure 1:
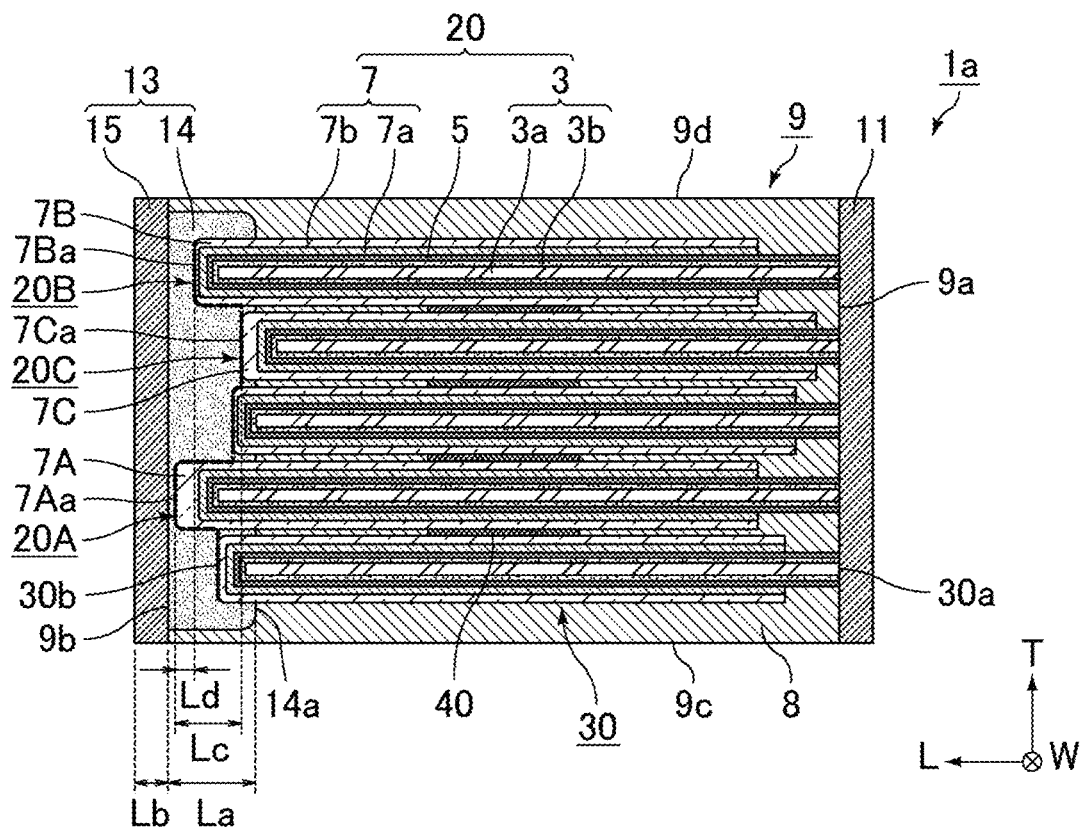
FIG. 1 is a schematic cross-sectional view showing an electrolytic capacitor of Embodiment 1 of the present invention.

The electrolytic capacitor of the present invention and the method of producing an electrolytic capacitor of the present invention are described below. The present invention is not limited to the following preferred embodiments and may be suitably modified without departing from the gist of the present invention. Combinations of preferred features described in the following preferred embodiments are also within the scope of the present invention.

The following embodiments are examples, and features of different embodiments can be partially exchanged or combined with each other. In the second embodiment and subsequent embodiments, a description of features common to the first embodiment is omitted, and only different points are described. In particular, similar effects by similar features are not mentioned in each embodiment. In the following description, the electrolytic capacitor of each embodiment is simply referred to as "the electrolytic capacitor of the present invention" when no distinction is made between the embodiments.

Embodiment 1

The electrolytic capacitor of the present invention includes: a stack defining a first end surface and a second end surface opposite to each other in a length direction and including multiple capacitor elements stacked in a thickness direction perpendicular to the length direction, each capacitor element of the multiple capacitor elements including an anode having a porous portion at a surface thereof and exposed at the first end surface of the stack, a dielectric layer on a surface of the porous portion, and a cathode opposite to the anode via the dielectric layer and exposed at the second end surface of the stack, the multiple capacitor elements including one or more first capacitor elements each including a first cathode and one or more second capacitor elements each including a second cathode; a first external electrode on the first end surface and electrically connected to the anode of at least one capacitor element of the multiple capacitor elements; and a second external electrode on the second end surface and electrically connected to at least the first cathode and the second cathode, wherein a first end of the first cathode that is closer to the second end surface is displaced from a second end of the second cathode that is closer to the second end surface in the length direction, the first end of the first cathode is first closest to the second external electrode in the length direction among all of ends of the cathodes of the multiple capacitor elements in the stack on sides thereof closer to the second end surface, the second end of the second cathode is second closest to the second external electrode in the length direction among the all of the ends of the cathodes of the multiple capacitor elements in the stack on the sides thereof closer to the second end surface, and in the length direction, an end of the second external electrode closer to the first external electrode is closer to the first external electrode than the second end of the second cathode.

In the electrolytic capacitor of the present invention, the second external electrode may include a first electrode layer and a second electrode layer connected to the first electrode layer; the first electrode layer may be connected to the first cathode and the second cathode; and in the length direction, an end of the first electrode layer on a side thereof closer to the first external electrode may be closer to the first external electrode than the end of the second cathode. Such a case is explained as an electrolytic capacitor of Embodiment 1 of the present invention.

FIG. 1 is a schematic cross-sectional view showing an electrolytic capacitor of Embodiment 1 of the present invention. As shown in FIG. 1, an electrolytic capacitor 1a includes a stack 30, a first external electrode 11, and a second external electrode 13.

Herein, a length direction, a width direction, and a thickness direction are directions indicated by L, W, and T, respectively, as shown in FIG. 1 and elsewhere. Here, the length direction L, the width direction W, and the thickness direction T are perpendicular to one another.

The stack 30 has a structure in which multiple capacitor elements 20 are stacked in the thickness direction T. In the stack 30, the capacitor elements 20 are bonded to each other via a conductive adhesive 40. The capacitor elements 20 may alternatively be in direct contact with each other.

The stack 30 includes a first end surface 30a and a second end surface 30b opposite to each other in the length direction L.

The capacitor element 20 includes an anode 3, a dielectric layer 5, and a cathode 7.

The anode 3 includes a valve-action metal substrate 3a at a center thereof and a porous portion 3b at a surface thereof.

Examples of valve-action metal of the valve-action metal substrate 3a include elemental metals such as aluminum, tantalum, niobium, titanium, zirconium, magnesium, and silicon, and alloys containing at least one of these metals. In particular, aluminum and an aluminum alloy are preferred.

The valve-action metal substrate 3a is preferably a flat plate, more preferably foil.

Preferably, the porous portion 3b is an etched layer of the valve-action metal substrate 3a etched with hydrochloric acid or the like.

The thickness of the valve-action metal substrate 3a before etching is preferably 60 μm to 180 μm. After etching, the thickness of the non-etched core of the valve-action metal substrate 3a is preferably 10 μm to 70 μm. The thickness of the porous portion 3b is designed according to the withstand voltage and capacitance required for the electrolytic capacitor 1a. In the cross section shown in FIG. 1, the total thickness of the porous portions 3b at both sides of the valve-action metal substrate 3a is preferably 10 μm to 120 μm. The porous portion 3b may be on one of main surfaces of the valve-action metal substrate 3a.

The anode 3 is exposed at the first end surface 30a of the stack 30 and connected to the first external electrode 11.

The dielectric layer 5 is on a surface of the porous portion 3b.

Preferably, the dielectric layer 5 is made of an oxide film of the valve-action metal. For example, when the valve-action metal substrate 3a is aluminum foil, the valve-action metal substrate 3a is anodized in an aqueous solution containing boric acid, phosphoric acid, adipic acid, a sodium salt or an ammonium salt thereof, or the like, whereby an oxide film that turns into the dielectric layer 5 is formed. The dielectric layer 5 is formed along the surface of the porous portion 3b, whereby pores (recesses) are formed in the dielectric layer 5.

The thickness of the dielectric layer 5 is designed according to the withstand voltage, capacitance, and the like required for the electrolytic capacitor 1a. The thickness is preferably 10 nm to 100 nm.

The cathode 7 is opposite to the anode 3 via the dielectric layer 5.

The cathode 7 includes a solid electrolyte layer 7a on a surface of the dielectric layer 5. Preferably, the cathode 7 includes a conductive layer 7b on a surface of the solid electrolyte layer 7a. The electrolytic capacitor 1a includes the solid electrolyte layer 7a as a part of the cathode 7 and is thus regarded as a solid electrolytic capacitor.

The electrolytic capacitor of the present invention may be an electrolytic capacitor including an electrolytic solution instead of a solid electrolyte; or may be an electrolytic capacitor including a solid electrolyte and an electrolytic solution.

Examples of constituent materials of the solid electrolyte layer 7a include a conductive polymer having a pyrrole, thiophene, or aniline skeleton. A conductive polymer having a thiophene skeleton is, for example, poly(3,4-ethylenedioxythiophene) (PEDOT), and may be PEDOT:PSS which is a complex with a dopant (poly(styrene sulfonate) (PSS)).

The solid electrolyte layer 7a is formed by, for example, a method in which a polymerized film of poly(3,4-ethylenedioxythiophene) or the like is formed on a surface of the dielectric layer 5 using a treatment liquid containing a monomer such as 3,4-ethylenedioxythiophene, or a method in which a dispersion of a polymer such as poly(3,4-ethylenedioxythiophene) is applied to the surface of the dielectric layer 5 and then dried. The solid electrolyte layer 7a is formed in a predetermined region by applying the treatment liquid or dispersion to the surface of the dielectric layer 5 by a method such as immersion coating, screen printing, transfer printing, inkjet printing, dispensing, or spray coating. Preferably, the solid electrolyte layer 7a is obtained by first forming a solid electrolyte layer for an inner layer for filling the pores (recesses) of the dielectric layer 5 and then forming a solid electrolyte layer for an outer layer for covering the entire dielectric layer 5.

The thickness of the solid electrolyte layer 7a is preferably 2 μm to 20 μm.

The conductive layer 7b is formed by applying a conductive paste such as a carbon paste, a graphene paste, or a silver paste to a surface of the solid electrolyte layer 7a by a method such as immersion coating, screen printing, transfer printing, inkjet printing, dispensing, or spray coating.

Preferably, the conductive layer 7b is a carbon layer, a graphene layer, or a silver layer formed as described above. The conductive layer 7b may be a composite layer in which a silver layer is disposed on a carbon layer or a graphene layer, or a mixed layer containing a mixture of a carbon paste or a graphene paste with a silver paste.

The thickness of the conductive layer 7b is preferably 2 μm to 20 μm.

The cathode 7 (here, the conductive layer 7b) is exposed at the second end surface 30b of the stack 30 and connected to the second external electrode 13. In other words, the conductive layer 7b is directly connected to the second external electrode 13, instead of being led out to the second external electrode 13 by a cathode lead-out layer or the like.

In FIG. 1, the capacitor elements 20 defining the stack 30 are displaced relative to each other in the length direction L. Further, the capacitor elements 20 have varying lengths in the length direction L in the vicinity of the ends of the cathodes 7 on the side closer to the second end surface 30b. Thus, the ends of the cathodes 7 on the side closer to the second end surface 30b are displaced in the length direction L at the second end surface 30b of the stack 30.

The capacitor elements 20 include a first capacitor element 20A including a first cathode 7A, a second capacitor element 20B including a second cathode 7B, and a third capacitor element 20C including a third cathode 7C. Herein, when no distinction is made between the first capacitor element, the second capacitor element, and the third capacitor element, each of these capacitor elements is simply referred to as "the capacitor element".

The capacitor elements 20 may or may not include another capacitor element in addition to the first capacitor element 20A, the second capacitor element 20B, and the third capacitor element 20C.

Each of the first cathode 7A, the second cathode 7B, and the third cathode 7C includes the solid electrolyte layer 7a and the conductive layer 7b. In other words, the cathode 7 includes the first cathode 7A, the second cathode 7B, and the third cathode 7C. Herein, when no distinction is made between the first cathode, the second cathode, and the third cathode, each of these cathodes is simply referred to as "the cathode".

An first end 7Aa of the first cathode 7A on the side closer to the second end surface 30b and an second end 7Ba of the second cathode 7B on the side closer to the second end surface 30b are displaced in the length direction L. The second end 7Ba of the second cathode 7B on the side closer to the second end surface 30b and a third end 7Ca of the third cathode 7C on the side closer to the second end surface 30b are displaced in the length direction L.

The first end 7Aa of the first cathode 7A on the side closer to the second end surface 30b is closest to the second external electrode 13 in the length direction L of all the ends of the cathodes 7 in the stack 30 on the side closer to the second end surface 30b.

The second end 7Ba of the second cathode 7B on the side closer to the second end surface 30b is second closest to the second external electrode 13 after the first end 7Aa of the first cathode 7A on the side closer to the second end surface 30b in the length direction L of all the ends of the cathodes 7 in the stack 30 on the side closer to the second end surface 30b.

The third end 7Ca of the third cathode 7C on the side closer to the second end surface 30b is closest to the first external electrode 11 in the length direction L of all the ends of the cathodes 7 in the stack 30 on the side closer to the second end surface 30b.

In the stack 30, the end of each cathode 7 on the side closer to the second end surface 30b is exposed at the second end surface 30b. In other words, in the stack 30, the end of each cathode 7 on the side closer to the second end surface 30b defines the second end surface 30b.

The second end surface 30b of the stack 30 is uneven as indicated by a dashed line in FIG. 1 because the ends of the cathodes 7 on the side closer to the second end surface 30b are displaced in the length direction L.

The first end 7Aa of the first cathode 7A on the side closer to the second end surface 30b, the second end 7Ba of the second cathode 7B on the side closer to the second end surface 30b, and the third end 7Ca of the third cathode 7C on the side closer to the second end surface 30b are defined by the ends of the conductive layers 7b on the side closer to the second end surface 30b. The ends of the cathodes 7 on the side closer to the second end surface 30b also are defined by the ends of the conductive layers 7b on the side closer to the second end surface 30b.

The stack 30 may include one first capacitor element 20A or multiple first capacitor elements 20A. In other words, the stack 30 may include one first cathode 7A or multiple first cathodes 7A. When the stack 30 includes multiple cathodes 7 each having an end closest to the second external electrode 13 in the length direction L of all the ends of the cathodes 7 in the stack 30 on the side closer to the second end surface 30b, all of these cathodes 7 correspond to the first cathodes 7A, so that the stack 30 includes multiple first cathodes 7A. In this case, the cathode 7 having an end second closest to the second external electrode 13 after the first ends 7Aa of the first cathodes 7A on the side closer to the second end surface 30b in the length direction L of all the ends of the cathodes 7 in the stack 30 on the side closer to the second end surface 30b is the second cathode 7B.

The stack 30 may include one second capacitor element 20B or multiple second capacitor elements 20B. In other words, the stack 30 may include one second cathode 7B or multiple second cathodes 7B. When the stack 30 includes multiple cathodes 7 each having an end second closest to the second external electrode 13 after the first end 7Aa of the first cathode 7A on the side closer to the second end surface 30b in the length direction L of all the ends of the cathodes 7 in the stack 30 on the side closer to the second end surface 30b, all of these cathodes 7 correspond to the second cathodes 7B, so that the stack 30 includes multiple second cathodes 7B.

The stack 30 may include one third capacitor element 20C or multiple third capacitor elements 20C. In other words, the stack 30 may include one third cathode 7C or multiple third cathodes 7C. When the stack 30 includes multiple cathodes 7 each having an end closest to the first external electrode 11 in the length direction L of all the ends of the cathodes 7 in the stack 30 on the side closer to the second end surface 30b, all of these cathodes 7 correspond to the third cathodes 7C, so that the stack 30 includes multiple third cathodes 7C.

The first external electrode 11 is on the first end surface 30a and connected to the anode 3 exposed at the first end surface 30a of the stack 30.

The second external electrode 13 is on the second end surface 30b and connected to the cathode 7 exposed at the second end surface 30b of the stack 30.

The second external electrode 13 may be only on one side of the second end surface 30b of the stack 30, which is further from the first end surface 30a. When a gap is present between adjacent capacitor elements 20, the second external electrode 13 may also be on the other side of the second end surface 30b of the stack 30, which is closer to the first end surface 30a such that the second external electrode 13 extends into the gap.

The second external electrode 13 includes a first electrode layer 14 and a second electrode layer 15 sequentially from the side closer to the second end surface 30b of the stack 30. The second electrode layer 15 is connected to the first electrode layer 14.

The second external electrode 13 is connected to the first cathode 7A and the second cathode 7B. In the length direction L, an end of the second external electrode 13 on the side closer to the first external electrode 11 is closer to the first external electrode 11 than the second end 7Ba of the second cathode 7B on the side closer to the second end surface 30b. More specifically, the first electrode layer 14 of the second external electrode 13 is connected to the first cathode 7A and the second cathode 7B. In the length direction L, an end 14a of the first electrode layer 14 on the side closer to the first external electrode 11 is closer to the first external electrode 11 than the second end 7Ba of the second cathode 7B on the side closer to the second end surface 30b. Thus, the first electrode layer 14 is connected to the first cathode 7A not only at the first end 7Aa on the side closer to the second end surface 30b but also at a top and a bottom opposite to each other in the thickness direction T of the first cathode 7A. The first electrode layer 14 is connected to the second cathode 7B not only at the second end 7Ba on the side closer to the second end surface 30b but also at a top and a bottom opposite to each other in the thickness direction T of the second cathode 7B. Thus, even when the ends of the cathodes 7 on the side closer to the second end surface 30b are displaced in the length direction L, the contact area between the first electrode layer 14 and the cathodes 7 tends to increase. Thus, the electrolytic capacitor 1a tends to have a lower ESR.

FIG. 1 shows a preferred embodiment in which the first electrode layer 14 of the second external electrode 13 is connected to all the cathodes 7 in the stack 30. More preferably, in the length direction L, the end 14a of the first electrode layer 14 on the side closer to the first external electrode 11 is closer to the first external electrode 11 than the third end 7Ca of the third cathode 7C on the side closer to the second end surface 30b is. Still more preferably, the first electrode layer 14 extends into all the gaps between adjacent capacitor elements 20. Thus, the first electrode layer 14 is connected to all the cathodes 7 not only at the ends of the cathodes 7 on the side closer to the second end surface 30b but also at the top and bottom opposite to each other in the thickness direction T of each cathode 7. This significantly increases the contact area between the first electrode layer 14 and the cathodes 7, which thus significantly reduces the ESR of the electrolytic capacitor 1a.

The first electrode layer 14 may not be connected to all the cathodes 7, as long as the first electrode layer 14 is connected to the first cathode 7A and the second cathode 7B, and an end 14a of the first electrode layer 14 on the side closer to the first external electrode 11 is closer to the first external electrode 11 in the length direction L than the second end 7Ba of the second cathode 7B on the side closer to the second end surface 30b.

A distance Lc in the length direction L is preferably 10 μm to 200 μm, more preferably 10 μm to 100 μm between the first end 7Aa of the first cathode 7A on the side closer to the second end surface 30b and the end of the cathode 7 on the side closer to the second end surface 30b and positioned closest to the first external electrode 11 in the length direction L of all the ends of the cathodes 7 in the stack 30 on the side closer to the second end surface 30b (here, the third end 7Ca of the third cathode 7C on the side closer to the second end surface 30b). A distance Ld in the length direction L may be 10 μm or more between the first end 7Aa of the first cathode 7A on the side closer to the second end surface 30b and the second end 7Ba of the second cathode 7B on the side closer to the second end surface 30b.

Preferably, a maximum length in the length direction L of the second external electrode 13 is greater than the distance Lc in the length direction L between the first end 7Aa of the first cathode 7A on the side closer to the second end surface 30b and the end of the cathode 7 on the side closer to the second end surface 30b and positioned closest to the first external electrode 11 in the length direction L of all the ends of the cathodes 7 in the stack 30 on the side closer to the second end surface 30b (here, the third end 7Ca of the third cathode 7C on the side closer to the second end surface 30b). Thus, particularly when the second external electrode 13 is connected to all the cathodes 7, the contact area between the second external electrode 13 and the cathodes 7 tends to increase, so that the electrolytic capacitor 1a tends to have a lower ESR.

In the electrolytic capacitor 1a, the maximum length in the length direction L of the second external electrode 13 is expressed by the sum of a maximum length La in the length direction L of the first electrode layer 14 and a maximum length Lb in the length direction L of the second electrode layer 15.

The maximum length La in the length direction L of the first electrode layer 14 indicates the maximum length in the length direction L of a region facing the second end surface 30b of the stack 30 in the first electrode layer 14.

The maximum length Lb in the length direction L of the second electrode layer 15 indicates the maximum length in the length direction L of a region facing the second end surface 30b of the stack 30 in the second electrode layer 15.

The maximum length La in the length direction L of the first electrode layer 14 may be the same as or different from the maximum length Lb in the length direction L of the second electrode layer 15. When the maximum length La is different from the maximum length Lb, the maximum length La may be greater than the maximum length Lb or may be smaller than the maximum length Lb.

Preferably, the maximum length La in the length direction L of the first electrode layer 14 is greater than the distance Lc in the length direction L between the first end 7Aa of the first cathode 7A on the side closer to the second end surface 30b and the end of the cathode 7 on the side closer to the second end surface 30b and positioned closest to the first external electrode 11 in the length direction L of all the ends of the cathodes 7 in the stack 30 on the side closer to the second end surface 30b (here, the third end 7Ca of the third cathode 7C on the side closer to the second end surface 30b). Thus, particularly when the first electrode layer 14 is connected to all the cathodes 7, the contact area between the first external electrode 14 and the cathodes 7 tends to increase, so that the electrolytic capacitor 1a tends to have a lower ESR.

As shown in FIG. 1, preferably, the electrolytic capacitor 1a further includes a sealing resin 8 sealing the stack 30 and the first electrode layer 14. Thus, a sealed body 9 in which the stack 30 and the first electrode layer 14 are sealed by the sealing resin 8 is provided.

The sealed body 9 includes an end surface 9a and an end surface 9b opposite to each other in the length direction L and a bottom surface 9c and a top surface 9d opposite to each other in the thickness direction T. The anode 3 is exposed at the end surface 9a of the sealed body 9. The first electrode layer 14 is exposed at the end surface 9b of the sealed body 9.

Preferably, the first electrode layer 14 is covered by the second electrode layer 15 and the sealing resin 8, so that the first electrode layer 14 is protected from oxygen, moisture, and the like.

The sealing resin 8 contains at least a resin, and preferably contains a resin and filler.

Preferred examples of the resin include an epoxy resin, a phenolic resin, a polyimide resin, a silicone resin, a polyamide resin, and a liquid crystal polymer.

Preferred examples of the filler include silica particles, alumina particles, and metal particles.

Preferably, the sealing resin 8 includes a material containing a solid epoxy resin, a phenolic resin and silica particles.

In use of the solid sealing resin 8, the sealed body 9 is preferably formed by a method that uses a resin mold such as a compression mold or a transfer mold, with a compression mold being more preferred. In use of the liquid sealing resin 8, the sealed body 9 is preferably formed by a method that uses a dispenser or printing. In particular, the sealed body 9 is preferably sealed by the sealing resin 8 using a compression mold.

The sealed body 9 may have rounded corners. The corners of the sealed body 9 may be rounded by barrel polishing, for example.

Preferably, the first external electrode 11 and the second external electrode 13 are each formed by at least one method selected from the group consisting of immersion coating, screen printing, transfer printing, inkjet printing, dispensing, spray coating, brush coating, drop casting, electrostatic coating, plating, and sputtering.

Preferably, the first external electrode 11 includes a resin electrode layer containing a conductive component and a resin component. The resin component in the first external electrode 11 improves the adhesion between the first external electrode 11 and the sealing resin 8, so that the electrolytic capacitor 1*a* tends to have a lower ESR of.

Preferably, the second external electrode 13 includes a resin electrode layer containing a conductive component and a resin component. More specifically, preferably, the second electrode layer 15 of the second external electrode 13 includes a resin electrode layer containing a conductive component and a resin component. The resin component in the second electrode layer 15 improves the adhesion between the second electrode layer 15 and the sealing resin 8, so that the electrolytic capacitor 1*a* tends to have a lower ESR.

When the second electrode layer 15 includes a resin electrode layer, preferably, the first electrode layer 14 includes a resin electrode layer. The resin components in both the first electrode layer 14 and the second electrode layer 15 improve the adhesion between the first electrode layer 14 and the second electrode layer 15. The resin component in the first electrode layer 14 improves the adhesion between the first electrode layer 14 and the sealing resin 8. Thus, the electrolytic capacitor 1*a* tends to have a lower ESR. When the first electrode layer 14 is covered by the second electrode layer 15 and the sealing resin 8 as shown in FIG. 1, the first electrode layer 14 is not required to have sufficient strength. For example, the resin component content of the first electrode layer 14 may be lower than the resin component content of the second electrode layer 15 or lower than the resin component content of the sealing resin 8.

Preferably, the conductive component mainly contains an elemental metal such as silver, copper, nickel, or tin or an alloy containing at least one of these metals, for example.

Preferably, the resin component mainly contains an epoxy resin, a phenolic resin, or the like.

The resin electrode layers are formed, for example, by a method such as immersion coating, screen printing, transfer printing, inkjet printing, dispensing, spray coating, brush coating, drop casting, or electrostatic coating. In particular, preferably, the resin electrode layers are printed resin electrode layers formed by applying a conductive paste by screen printing. When the resin electrode layers are formed by applying a conductive paste by screen printing, the first external electrode 11 and the second external electrode 13 tend to be flat, as compared to when the resin electrode layers are formed by applying a conductive paste by immersion coating. In other words, the thickness of the first external electrode 11 and the thickness of the second external electrode 13 tend to be uniform.

When the first electrode layer 14 includes a resin electrode layer, preferably, the cathode 7 includes a resin electrode layer. More specifically, preferably, the cathode 7 includes the conductive layer 7*b* such as a carbon layer, a graphene layer, or a silver layer as the resin electrode layer. The resin components in both the first electrode layer 14 and the cathode 7 improve the adhesion between the first electrode layer 14 and the cathode 7, so that the electrolytic capacitor 1*a* tends to have a lower ESR.

One or both of the first external electrode 11 and the second external electrode 13 may include a plating layer formed by plating. Examples of the plating layer include a zinc-silver-nickel layer, a silver-nickel layer, a nickel layer, zinc-nickel-gold layer, a nickel-gold layer, a zinc-nickel-copper layer, and a nickel-copper layer. Preferably, such a plating layer is sequentially overlaid by, for example, a copper plating layer, a nickel plating layer, and a tin plating layer (alternatively, one or some of these plating layers may be excluded).

One or both of the first external electrode 11 and the second external electrode 13 may include a resin electrode layer and a plating layer. For example, the first external electrode 11 may include a resin electrode layer connected to the anode 3 and an outer plating layer on a surface of the resin electrode layer on the side opposite to the anode 3. The first external electrode 11 may include an inner plating layer connected to the anode 3, a resin electrode layer covering the inner plating layer, and an outer plating layer on a surface of the resin electrode layer on the side further from the anode 3.

In the second external electrode 13, the first electrode layer 14 and the second electrode layer 15 may be made of the same material or different materials. Even when the first electrode layer 14 and the second electrode layer 15 are made of the same material, the first electrode layer 14 and the second electrode layer 15 can be distinguished from each other by observing the interface therebetween by a scanning electron microscope (SEM) or the like.

The method of producing an electrolytic capacitor includes: forming a stack defining a first end surface and a second end surface opposite to each other in a length direction and including multiple capacitor elements stacked in a thickness direction perpendicular to the length direction, each capacitor element of the multiple capacitor elements including an anode having a porous portion at a surface thereof, a dielectric layer on a surface of the porous portion, and a cathode opposite to the anode via the dielectric layer, wherein the multiple capacitor elements include a first capacitor element including a first cathode having a first end that is first closest to the second end surface and is first furthest from the first end surface in the length direction among all of ends of the cathodes of the multiple capacitor elements on sides thereof closer to the second end surface, and a second capacitor element including a second cathode having a second end that is second closest to the second end surface on a side thereof closer to the second end surface in the length direction and is second furthest from the first end surface in the length direction among the all of the ends of the cathodes of the multiple capacitor elements on the sides thereof closer to the second end surface; forming a first electrode layer on the second end surface of the stack such that the first electrode layer is connected to the first cathode and the second cathode; forming a sealed body such that the anodes of the multiple capacitor elements are exposed at one end surface in the length direction of the sealed body and the first electrode layer is exposed at the other end surface in the length direction thereof by sealing the stack and the first electrode layer with a sealing resin; forming a first external electrode on the one end surface of the sealed body and connected to the anode of at least one capacitor element of the multiple capacitor elements; and forming a second electrode layer on the other end surface of the sealed body and connected to the first electrode layer to form a second external electrode. Such a case is described below as a method of producing the electrolytic capacitor of Embodiment 1 of the present invention, i.e., a method of producing the electrolytic capacitor 1a shown in FIG. 1.

Forming Resin Molding

Figure 2:
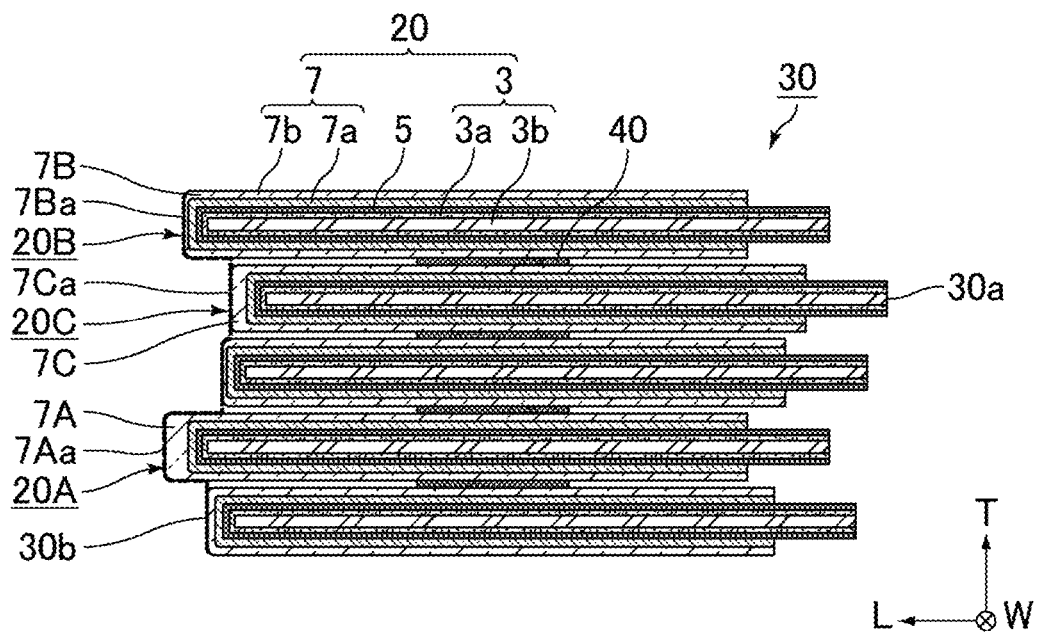
FIG. 2 is a schematic cross-sectional view showing an example of forming a stack in a method of producing the electrolytic capacitor of Embodiment 1 of the present invention.

FIG. 2 is a schematic cross-sectional view showing an example of forming a stack in the method of producing the electrolytic capacitor of Embodiment 1 of the present invention.

First, the valve-action metal substrate 3a including the porous portion 3b at the surface thereof, i.e., the anode 3, is provided. Then, the anode 3 is anodized to form the dielectric layer 5 on the surface of the porous portion 3b of the anode 3. Next, the solid electrolyte layer 7a is formed on a surface of the dielectric layer 5 by a method such as immersion coating. Further, the conductive layer 7b is formed on a surface of the solid electrolyte layer 7a by a method such as immersion coating. As described above, the dielectric layer 5 and the cathode 7 including the solid electrolyte layer 7a and the conductive layer 7b are sequentially formed on the surface of the porous portion 3b of the anode 3, whereby the capacitor element 20 as shown in FIG. 2 is formed.

Next, the multiple capacitor elements 20 are stacked in the thickness direction T with the conductive adhesive 40 between each capacitor element 20, whereby the stack 30 shown in FIG. 2 is formed. The stack 30 includes the first end surface 30a and the second end surface 30b opposite to each other in the length direction L.

In this step, the capacitor elements 20 defining the stack 30 are displaced from each other in the length direction L, and the capacitor elements 20 have varying lengths in the length direction L in the vicinity of the ends of the cathodes 7 on the side closer to the second end surface 30b. Thus, at the second end surface 30b of the stack 30, the ends of the cathodes 7 on the side closer to the second end surface 30b are displaced as shown in FIG. 2. More specifically, the capacitor elements 20 include the first capacitor element 20A including the first cathode 7A, the second capacitor element 20B including the second cathode 7B, and the third capacitor element 20C including the third cathode 7C. The first end 7Aa of the first cathode 7A on the side closer to the second end surface 30b is furthest from the first end surface 30a in the length direction L of all the ends of the cathodes 7 on the side closer to the second end surface 30b. The second end 7Ba of the second cathode 7B on the side closer to the second end surface 30b is displaced from the first end 7Aa of the first cathode 7A on the side closer to the second end surface 30b in the length direction L and is second furthest from the first end surface 30a after the first end 7Aa of the first cathode 7A on the side closer to the second end surface 30b in the length direction L of all the ends of the cathodes 7 on the side closer to the second end surface 30b. The third end 7Ca of the third cathode 7C on the side closer to the second end surface 30b is closest to the first end surface 30a in the length direction L of all the ends of the cathodes 7 on the side closer to the second end surface 30b.

Forming First Electrode Layer

Figure 3:
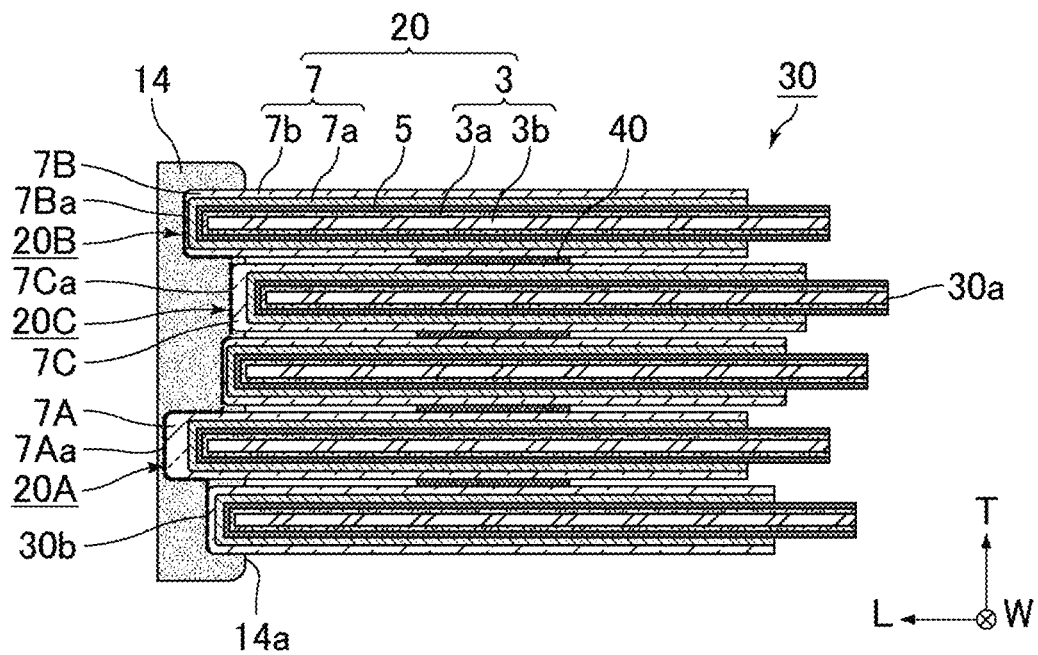
FIG. 3 is a schematic cross-sectional view showing an example of forming a first electrode layer in the method of producing the electrolytic capacitor of Embodiment 1 of the present invention.

FIG. 3 is a schematic cross-sectional view showing an example of forming a first electrode layer in the method of producing the electrolytic capacitor of Embodiment 1 of the present invention.

The first electrode layer 14 is formed on the second end surface 30b of the stack 30 such that the first electrode layer 14 is connected to the first cathode 7A and the second cathode 7B and that the end 14a of the first electrode layer 14 on the side closer to the first end surface 30a is closer to the first end surface 30a in the length direction L than the second end 7Ba of the second cathode 7B on the side closer to the second end surface 30b is. FIG. 3 shows a preferred embodiment in which the first electrode layer 14 is formed to be connected to all the cathodes 7 in the stack 30. More preferably, the end 14a of the first electrode layer 14 on the side closer to the first end surface 30a is closer to the first end surface 30a than the third end 7Ca of the third cathode 7C on the side closer to the second end surface 30b is. Still more preferably, the first electrode layer 14 extends into all the gaps between adjacent capacitor elements 20.

In this step, preferably, the first electrode layer 14 is formed by immersion coating, screen printing, transfer printing, inkjet printing, dispensing, spray coating, brush coating, drop casting, electrostatic coating, plating, or sputtering. Here, preferably, the first electrode layer 14, more specifically, the resin electrode layer as the first electrode layer 14 is formed by using a conductive paste containing a conductive component and a resin component by immersion coating, screen printing, transfer printing, inkjet printing, dispensing, spray coating, brush coating, drop casting, or electrostatic coating.

Forming Sealed Body

Figure 4:
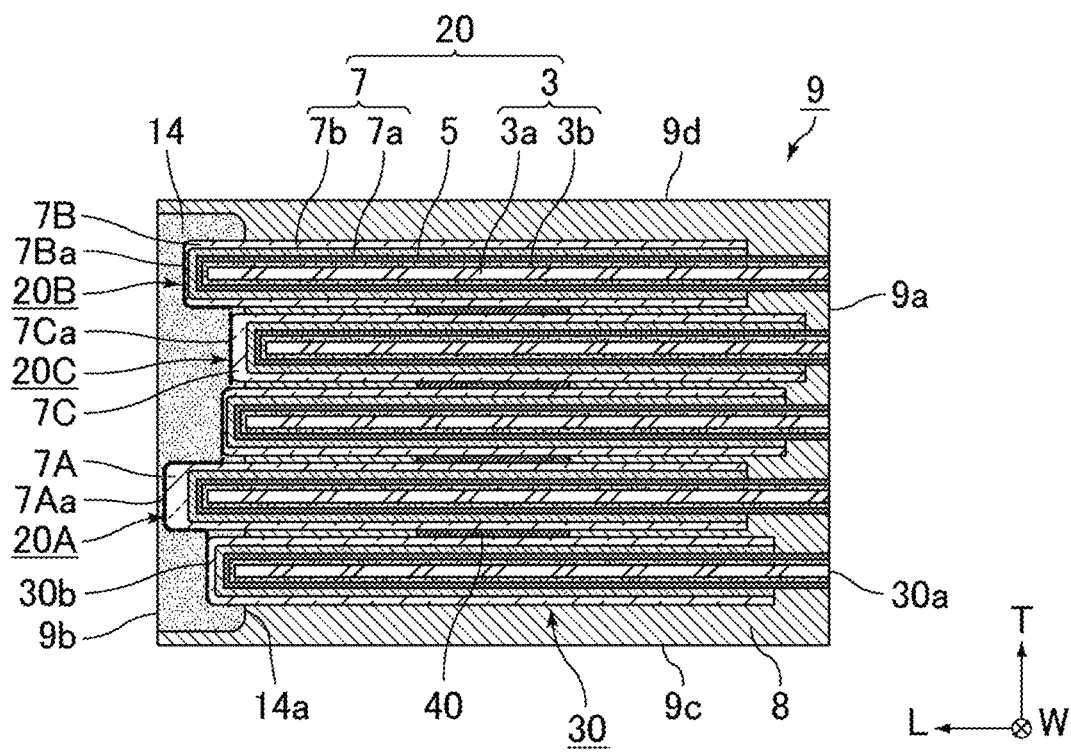
FIG. 4 is a schematic cross-sectional view showing an example of forming a sealed body in the method of producing the electrolytic capacitor of Embodiment 1 of the present invention.

FIG. 4 is a schematic cross-sectional view showing an example of forming a sealed body in the method of producing the electrolytic capacitor of Embodiment 1 of the present invention.

As shown in FIG. 4, a compression mold or the like is used to seal the stack 30 and the first electrode layer 14 by the sealing resin 8, whereby the sealed body 9 is formed. In producing the sealed body 9, excessive portions of the anode 3, the dielectric layer 5, and the sealing resin 8 are removed by cutting with a dicer or the like to align the ends of the anode 3 at one end surface (here, the end surface 9a) of the sealed body 9 in the length direction L, whereby the sealed body 9 as an individual piece is obtained. Thus, the anode 3 is exposed at the end surface 9a of the sealed body 9. At the same time, the first electrode layer 14 is exposed at the other end surface (here, the end surface 9b) in the length direction L of the sealed body 9.

Forming First External Electrode

Figure 5:
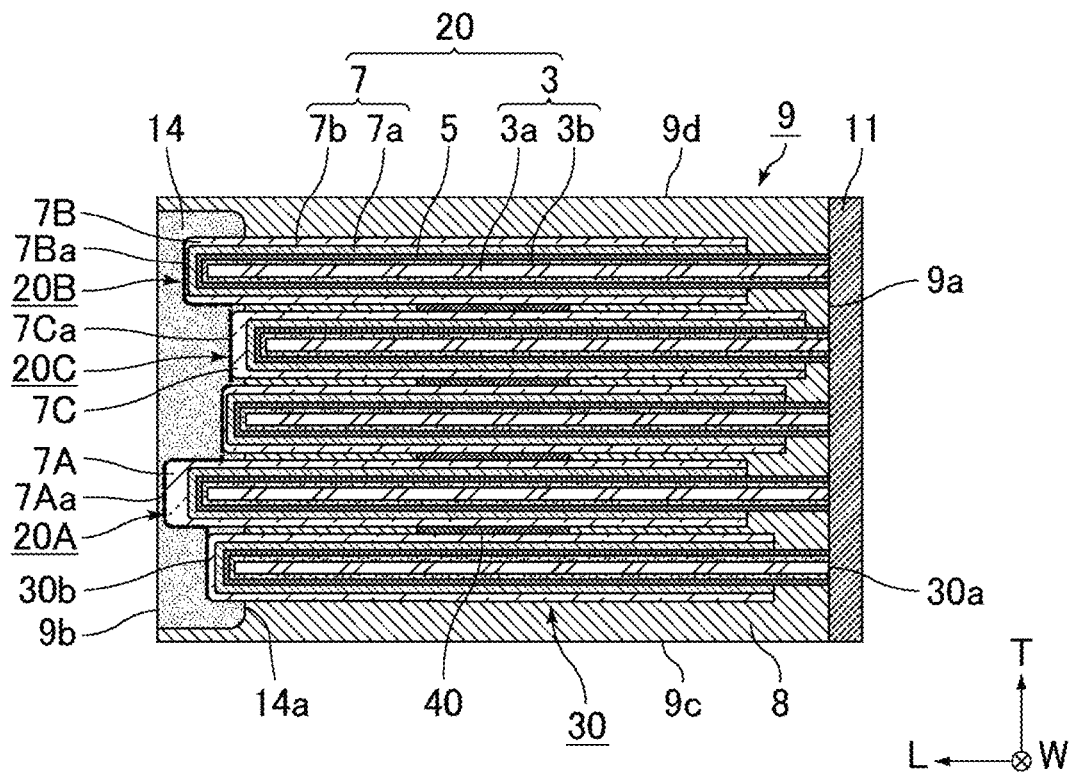
FIG. 5 is a schematic cross-sectional view showing an example of forming a first external electrode in the method of producing the electrolytic capacitor of Embodiment 1 of the present invention.

FIG. 5 is a schematic cross-sectional view showing an example of forming a first external electrode in the method of producing the electrolytic capacitor of Embodiment 1 of the present invention.

As shown in FIG. 5, the first external electrode 11 connected to the anode 3 is formed on the end surface 9a of the sealed body 9.

In this step, preferably, the first external electrode 11 is formed by at least one method selected from the group consisting of immersion coating, screen printing, transfer printing, inkjet printing, dispensing, spray coating, brush coating, drop casting, electrostatic coating, plating, and sputtering. Here, preferably, the first external electrode 11, more specifically, the resin electrode layer as the first external electrode 11, is formed using a conductive paste containing a conductive component and a resin component by immersion coating, screen printing, transfer printing, inkjet printing, dispensing, spray coating, brush coating, drop casting, or electrostatic coating.

Forming Second External Electrode

Figure 6:
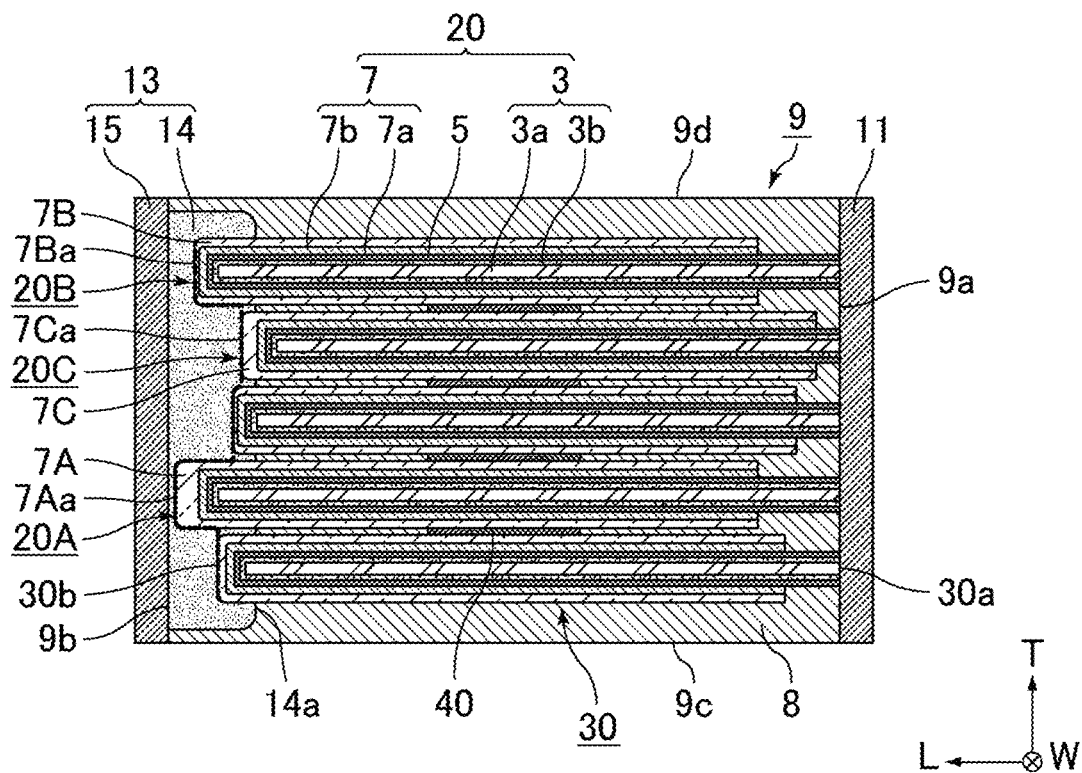
FIG. 6 is a schematic cross-sectional view showing an example of forming a second external electrode in the method of producing electrolytic capacitor of Embodiment 1 of the present invention.

FIG. 6 is a schematic cross-sectional view showing an example of forming a second external electrode in the method of producing the electrolytic capacitor of Embodiment 1 of the present invention.

As shown in FIG. 6, the second electrode layer 15 connected to the first electrode layer 14 is formed on the end surface 9b of the sealed body 9. Thus, the second external electrode 13 is formed which includes the first electrode layer 14 and the second electrode layer 15 connected to the first electrode layer 14 sequentially from the side closer to the second end surface 30b of the stack 30.

In this step, preferably, the second electrode layer 15 is formed by immersion coating, screen printing, transfer printing, inkjet printing, dispensing, spray coating, brush coating, drop casting, electrostatic coating, plating, or sputtering. Here, preferably, the second electrode layer 15, more specifically, the resin electrode layer as the second electrode layer 15, is formed using a conductive paste containing a conductive component and a resin component by immersion coating, screen printing, transfer printing, inkjet printing, dispensing, spray coating, brush coating, drop casting, or electrostatic coating.

The forming a first external electrode and the forming a second external electrode may be performed separately or simultaneously. When these steps are performed separately, the order is not limited.

Thus, the electrolytic capacitor 1a shown in FIG. 1 is produced.

In producing the electrolytic capacitor 1a, the first electrode layer 14 is formed first, and the stack 30 and the first electrode layer 14 are then sealed by the sealing resin 8. However, the first electrode layer 14 may be formed after the stack 30 is sealed by the sealing resin 8. When the stack 30 is sealed by the sealing resin 8 before forming the first electrode layer 14 as described above, the stack 30 is sealed such that at least the first cathode 7A and the second cathode 7B are exposed from the sealing resin 8. Thus, when the first electrode layer 14 is formed subsequently, the end 14a of the first electrode layer 14 on the side closer to the first end surface 30a of the stack 30 is closer to the first end surface 30a than the second end 7Ba of the second cathode 7B on the side closer to the second end surface 30b is. Preferably, the stack 30 is sealed by the sealing resin 8 such that the ends of all the cathodes 7 on the side closer to the second end surface 30b are exposed from the sealing resin 8. Thus, when the first electrode layer 14 is formed subsequently, the first electrode layer 14 is easily connected to all the cathodes 7.

In the electrolytic capacitor 1a, the second electrode layer 15 is only on the end surface 9b of the sealed body 9, but the second electrode layer 15 may extend from the end surface 9b of the sealed body 9 to one of both of the bottom surface 9c and the top surface 9d.

Figure 7:
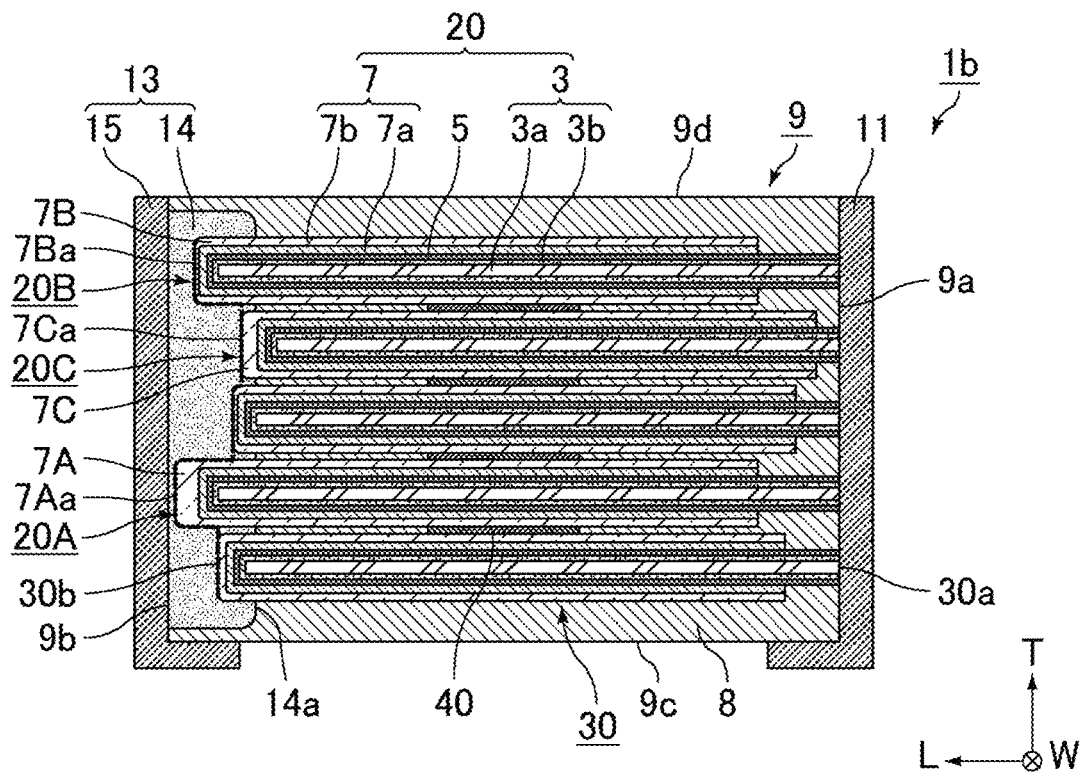
FIG. 7 is a schematic cross-sectional view showing another example of arrangement of a second electrode layer, different from the example shown in FIG. 1.

FIG. 7 is a schematic cross-sectional view showing another example of arrangement of the second electrode layer, different from the example shown in FIG. 1. In an electrolytic capacitor 1b shown in FIG. 7, the second electrode layer 15 extends from the end surface 9b of the sealed body 9 to a portion of the bottom surface 9c.

Figure 8:
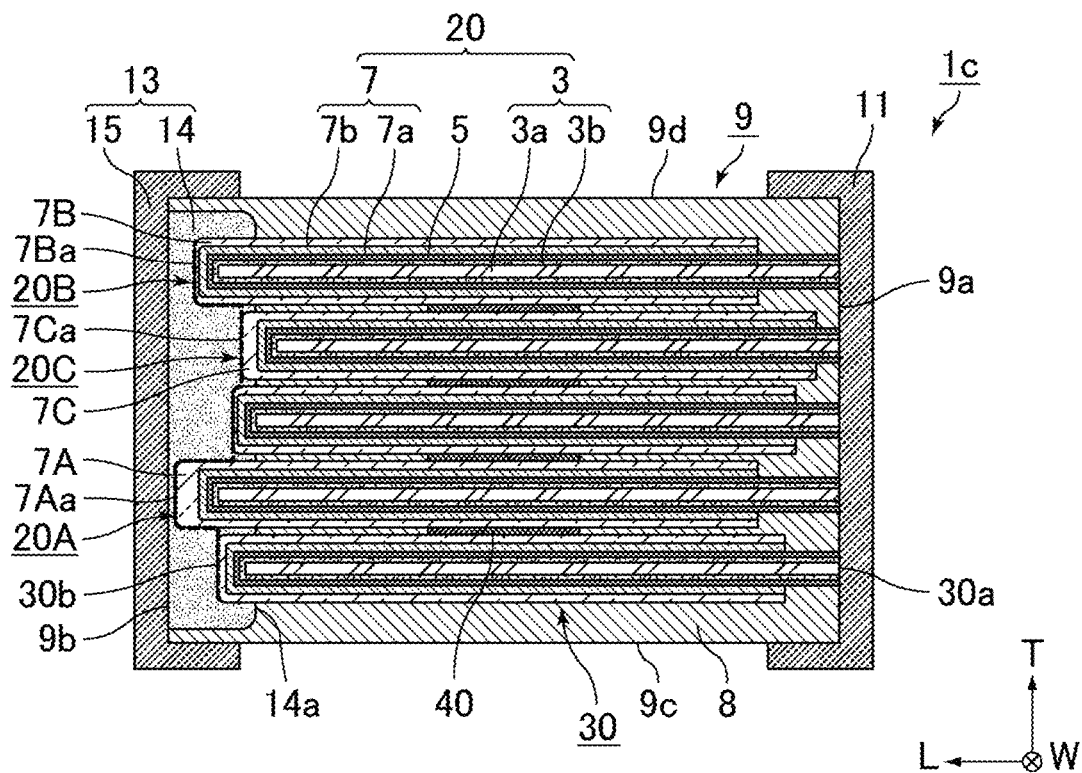
FIG. 8 is a schematic cross-sectional view showing another example of arrangement of the second electrode layer, different from the examples shown in FIG. 1 and FIG. 7.

FIG. 8 is a schematic cross-sectional view showing another example of arrangement of the second electrode layer, different from the examples shown in FIG. 1 and FIG. 7. In an electrolytic capacitor 1c shown in FIG. 8, the second electrode layer 15 extends from the end surface 9b of the sealed body 9 to a portion of the bottom surface 9c and a portion of the top surface 9d.

Although not shown, the second electrode layer 15 may extend from the end surface 9b of the sealed body 9 to a portion of the top surface 9d.

In the electrolytic capacitor 1a, the first external electrode 11 is only on the end surface 9a of the sealed body 9, but the first external electrode 11 may extend from the end surface 9a of the sealed body 9 to one or both of the bottom surface 9c and the top surface 9d. In other words, the first external electrode 11 may extend from the end surface 9a of the sealed body 9 to a portion of the bottom surface 9c as shown in FIG. 7; to a portion of the bottom surface 9c and a portion of the top surface 9d as shown in FIG. 8; or to a portion of the top surface 9d (not shown).

In the electrolytic capacitor 1a, the second external electrode 13 has a two-layer structure including the first electrode layer 14 and the second electrode layer 15, but the second external electrode 13 may have a single-layer structure or a multilayer structure including three or more layers.

Figure 9:
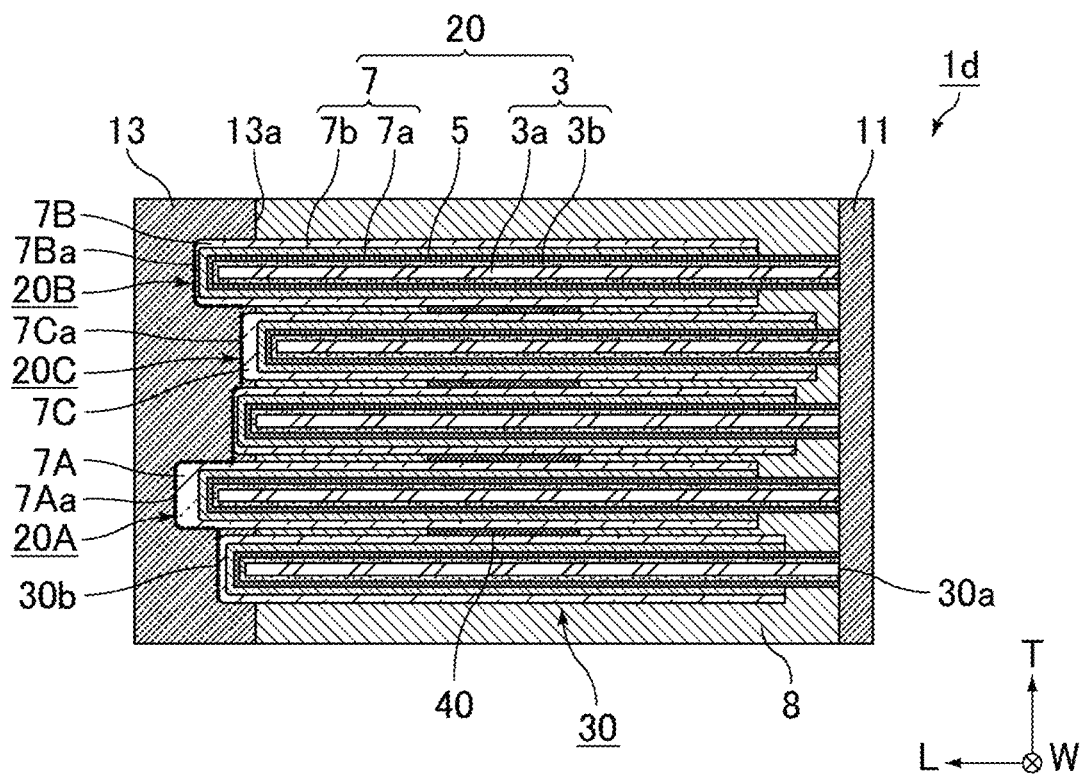
FIG. 9 is a schematic cross-sectional view showing another example of an embodiment of the second external electrode, different from the example shown in FIG. 1.

FIG. 9 is a schematic cross-sectional view showing another example of an embodiment of the second external electrode, different from the example shown in FIG. 1. In electrolytic capacitor 1d shown in FIG. 9, the second external electrode 13 has a single-layer structure including only one layer.

FIG. 9 shows a preferred embodiment in which the second external electrode 13 is connected to all the cathodes 7 in the stack 30. More preferably, in the length direction L, an end 13a of the second external electrode 13 on the side closer to the first external electrode 11 is closer to the first external electrode 11 than the third end 7Ca of the third cathode 7C on the side closer to the second end surface 30b is. Still more preferably, the second external electrode 13 extends into all the gaps between adjacent capacitor elements 20. Thus, the second external electrode 13 is connected to all the cathodes 7 not only at the ends of the cathodes 7 on the side closer to the second end surface 30b but also at the top and bottom opposite to each other in the thickness direction T of each cathode 7. This significantly increases the contact area between the second external electrode 13 and the cathodes 7, which thus significantly reduces the ESR of the electrolytic capacitor 1d.

The second external electrode 13 may not be connected to all the cathodes 7, as long as the second external electrode 13 is connected to the first cathode 7A and the second cathode 7B, and the end 13a of the second external electrode 13 on the side closer to the first external electrode 11 is closer to the first external electrode 11 in the length direction L than the second end 7Ba of the second cathode 7B on the side closer to the second end surface 30b is.

Preferably, the maximum length in the length direction L of the second external electrode 13 is greater than the distance Lc in the length direction L between the first end 7Aa of the first cathode 7A on the side closer to the second end surface 30b and the end of the cathode 7 on the side closer to the second end surface 30b and positioned closest to the first external electrode 11 in the length direction L of all the ends of the cathodes 7 in the stack 30 on the side closer to the second end surface 30b (here, the third end 7Ca of the third cathode 7C on the side closer to the second end surface 30b). Thus, particularly when the second external electrode 13 is connected to all the cathodes 7, the contact area between the second external electrode 13 and the cathodes 7 tends to increase, so that the electrolytic capacitor 1d tends to have a lower ESR.

Embodiment 2

In the electrolytic capacitor of the present invention, at least one of the one or more first capacitor elements may be adjacent to at least one of the one or more second capacitor elements in the thickness direction. Such a case is described below as an electrolytic capacitor of Embodiment 2 of the present invention. The electrolytic capacitor of Embodiment 2 of the present invention is the same as the electrolytic capacitor of Embodiment 1 of the present invention, except that the pattern of displacement of the ends of the cathodes on the side closer to the second end surface is different.

Figure 10:
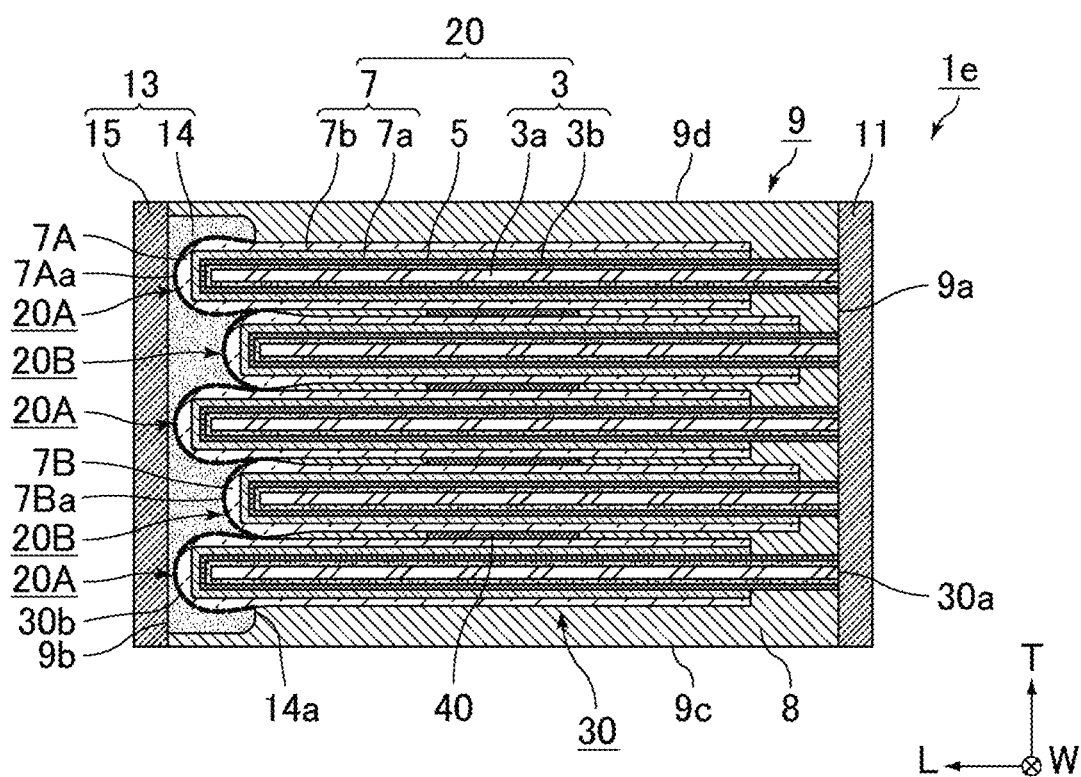
FIG. 10 is a schematic cross-sectional view showing an electrolytic capacitor of Embodiment 2 of the present invention.

FIG. 10 is a schematic cross-sectional view shown the electrolytic capacitor of Embodiment 2 of the present invention. In an electrolytic capacitor 1e shown in FIG. 10, the first capacitor element 20A and the second capacitor element 20B are adjacent to each other.

FIG. 10 shows the following embodiment as a preferred embodiment. The second end 7Ba of the second cathode 7B on the side closer to the second end surface 30b is closest to the first external electrode 11 in the length direction L of all the ends of the cathodes 7 in the stack 30 on the side closer to the second end surface 30b. In other words, in the electrolytic capacitor 1e, the cathodes 7 include the first cathode 7A and the second cathode 7B. In other words, in the electrolytic capacitor 1e, the capacitor elements 20 include the first capacitor element 20A and the second capacitor element 20B. In the stack 30, the first capacitor elements 20A and the second capacitor elements 20B are alternately stacked in the thickness direction T.

In forming the cathodes 7, the solid electrolyte layer 7a and the conductive layer 7b may be formed by immersion coating as described above. For example, when forming the conductive layer 7b by applying a conductive paste by immersion coating, the applied conductive paste tends to gather at the ends of the cathodes 7 due to the effects of gravity. As a result, the cathodes 7 (here, the conductive layers 7b) have bulging outer shapes at the ends of the respective capacitor elements 20 as shown in FIG. 10. Stacking the multiple capacitor elements 20 having such bulging-shaped ends tends to result in the stack 30 having an increased length in the thickness direction T because the bulges at the ends of the capacitor elements 20 interfere with each other when the capacitor elements 20 are stacked in such manner to prevent displacement in the length direction L or when the pattern of displacement (if occurs) is random as shown in FIG. 1.

In contrast, in the electrolytic capacitor 1e, the first capacitor elements 20A and the second capacitor elements 20B are alternately stacked in the thickness direction T, i.e., the ends of the cathodes 7 on the side closer to the second end surface 30b are intentionally displaced in the length direction L such that the cathodes 7A and the cathodes 7B are alternately arranged in the thickness direction T. Thus, although the ends of the capacitor elements 20 on the side closer to the second end surface 30b are bulged, the electrolytic capacitor 1e tends to have a reduced length in the thickness direction T of the stack 30 and is easily miniaturized, as compared to the case where the pattern of displacement of the ends of the cathode 7 on the side closer to the second end surface 30b is random as shown in FIG. 1. In addition, the electrolytic capacitor 1e tends to have high capacitance because the length in the length direction L of the effective area of the capacitor elements 20 tends to increase, as compared to an electrolytic capacitor of the same size such as the one in which the pattern of displacement of the ends of the cathodes 7 on the side closer to the second end surface 30b is random as shown in FIG. 1.

The pattern of displacement of the ends of the cathodes 7 on the side closer to the second end surface 30b may be different from the ones shown in FIG. 1 and FIG. 10. For example, the pattern may be one in which the ends of the cathodes 7 on the side closer to the second end surface 30b are displaced toward the side closer to the second external electrode in the length direction L as the cathodes 7 are stacked from the bottom surface to the top surface or vice versa of the stack 30 in the thickness direction T. In this case, the first capacitor element 20A and the second capacitor element 20B are adjacent to each other.

EXAMPLES

Examples that more specifically disclose the electrolytic capacitor of the present invention are described below. In the following examples, a solid electrolytic capacitor is described as the electrolytic capacitor of the present invention. The present invention is not limited to these examples.

Example 1

A solid electrolytic capacitor of Example 1 was produced by the following method.

Forming Stack

First, an anode including aluminum foil as a valve-action metal substrate at a center thereof and an etched layer as a porous portion at a surface thereof was provided. Next, the anode was immersed in an aqueous solution of ammonium adipate for anodization, whereby a dielectric layer was formed on a surface of the porous portion of the anode. Then, the resulting structure was immersed in an aqueous dispersion of poly(3,4-ethylenedioxythiophene) and then dried, whereby a solid electrolyte layer was formed on a surface of the dielectric layer. Further, the resulting structure was immersed in a carbon paste and then immersed in a silver paste, whereby a conductive layer in which a carbon layer and a silver layer were sequentially stacked on the surface of the solid electrolyte layer was formed. Thus, a capacitor element having a structure shown in FIG. 2 was formed.

Next, multiple capacitor elements were stacked via a conductive adhesive, whereby a stack having a structure shown in FIG. 2 was formed.

Forming First Electrode Layer

The stack was immersed in a silver paste, whereby a first electrode layer having a structure shown in FIG. 3 was formed on a second end surface of the stack. The first electrode layer was connected to all the cathodes in the stack.

Forming Sealed Body

While the stack and the first electrode layer were sealed by a sealing resin containing an epoxy resin and silica particles, singulation was performed by a dicer, whereby a sealed body having a structure as shown in FIG. 4 was formed. The anode was exposed at one end surface in the length direction of the sealed body, and the first electrode layer was exposed at the other end surface in the length direction of the sealed body.

Forming First External Electrode

A silver paste was screen printed on the sealed body, whereby a first external electrode having a structure as shown in FIG. 5 was formed on the one end surface of the sealed body.

Forming Second External Electrode

A silver paste was screen printed on the sealed body, whereby a second external electrode having a structure as shown in FIG. 6 was formed on the other end surface of the sealed body. This resulted in a second external electrode including the first electrode layer and a second electrode layer connected to the first electrode layer sequentially from the side closer to the second end surface of the stack.

Thus, the solid electrolytic capacitor of Example 1 having a structure shown in the FIG. 1 was produced. The specifications of the solid electrolytic capacitor of Example 1 were as follows.

Maximum length (maximum length La in FIG. 1) in the length direction of the first electrode layer: 50 μm Maximum length (maximum length Lb in FIG. 1) in the length direction of the second electrode layer: 20 μm The distance (the distance Lc in FIG. 1) in the length direction between the end of the third cathode on the side closer to the second end surface and the end of the first cathode on the side closer to the second end surface: 30 μm.

Comparative Example 1

A solid electrolytic capacitor of Comparative Example 1 was produced similarly to the solid electrolytic capacitor of Example 1, except that the first electrode layer was not formed. In other words, the solid electrolytic capacitor of Comparative Example 1 was produced by sealing the stack using the sealing resin and then forming the first external electrode and the second external electrode.

Evaluation

The solid electrolytic capacitors of Example 1 and Comparative Example 1 were evaluated as follows. Table 1 shows the results.

High Temperature Test

First, the ESR of each solid electrolytic capacitor was measured. Next, the solid electrolytic capacitor of each example was left to stand at a temperature of 105° C. for 1000 hours for a high temperature test. Changes in equivalent series resistance (ESR) induced by the high temperature test were determined as a ratio of "ESR after high temperature test"/"ESR before high temperature test".

TABLE 1

|  | High temperature test | |
| --- | --- | --- |
|  | ESR (mΩ) before high temperature test | Changes in ESR |
| Example 1 | 20 | 1.1 |
| Comparative Example 1 | 25 | 1.3 |

As shown in Table 1, the solid electrolytic capacitor of Example 1 had a low ESR before the high temperature test and showed small changes in ESR induced by the high temperature test, as compared to the solid electrolytic capacitor of Comparative Example 1. In other words, the ESR was low in the solid electrolytic capacitor of Example 1 even when displacement occurred in the stack at the ends of the cathodes on the side closer to the second end surface in the length direction.

REFERENCE SIGNS LIST 1a, 1b, 1c, 1d, 1e electrolytic capacitor
3 anode
3a valve-action metal substrate
3b porous portion
5 dielectric layer
7 cathode
7A first cathode
7Aa first end of first cathode on side closer to second end surface
7B second cathode
7Ba second end of second cathode on side closer to second end surface
7C third cathode
7Ca third end of third cathode on side closer to second end surface
7a solid electrolyte layer
7b conductive layer
8 sealing resin
9 sealed body
9a, 9b end surface of sealed body
9c bottom surface of sealed body
9d top surface of sealed body
11 first external electrode
13 second external electrode
13a end of second external electrode on side closer to first external electrode
14 first electrode layer
14a end of first electrode layer on side closer to first external electrode (first end surface)
15 second electrode layer
20 capacitor element
20A first capacitor element
20B second capacitor element
20C third capacitor element
30 stack
30a first end surface of stack
30b second end surface of stack
40 conductive adhesive
L length direction
La maximum length in length direction of first electrode layer
Lb maximum length in length direction of second electrode layer
Lc distance in length direction between third end of third cathode on side closer to second end surface and first end of first cathode on side closer to second end surface
Ld distance in length direction between first end of first cathode on side closer to second end surface and second end of second cathode on side closer to second end surface
T thickness direction
W width direction

The invention claimed is:

1. An electrolytic capacitor comprising:
a stack defining a first end surface and a second end surface opposite to each other in a length direction and including multiple capacitor elements stacked in a thickness direction perpendicular to the length direction, each capacitor element of the multiple capacitor elements including an anode having a porous portion at a surface thereof and exposed at the first end surface of the stack, a dielectric layer on a surface of the porous portion, and a cathode opposite to the anode via the dielectric layer and exposed at the second end surface of the stack, the multiple capacitor elements including one or more first capacitor elements each including a first cathode and one or more second capacitor elements each including a second cathode;
a first external electrode on the first end surface and electrically connected to the anode of at least one capacitor element of the multiple capacitor elements; and
a second external electrode on the second end surface and electrically connected to at least the first cathode and the second cathode,
wherein a first end of the first cathode that is closer to the second end surface is displaced from a second end of the second cathode that is closer to the second end surface in the length direction, the first end of the first cathode is first closest to the second external electrode in the length direction among all of ends of the cathodes of the multiple capacitor elements in the stack on sides thereof closer to the second end surface,
the second end of the second cathode is second closest to the second external electrode in the length direction among the all of the ends of the cathodes of the multiple capacitor elements in the stack on the sides thereof closer to the second end surface, and
in the length direction, an end of the second external electrode closer to the first external electrode is closer to the first external electrode than the second end of the second cathode.

2. The electrolytic capacitor according to claim 1, wherein a distance in the length direction is 10 μm to 200 μm between the first end of the first cathode and an end of a furthest cathode on a side thereof closer to the second end surface and closest to the first external electrode in the length direction among the all of the ends of the cathodes of the multiple capacitor elements in the stack on the sides thereof closer to the second end surface.

3. The electrolytic capacitor according to claim 2, wherein a maximum length in the length direction of the second external electrode is greater than the distance in the length direction between the first end of the first cathode and the end of the furthest cathode on the side thereof closer to the second end surface and closest to the first external electrode in the length direction among the all of the ends of the cathodes of the multiple capacitor elements in the stack on the sides thereof closer to the second end surface.

4. The electrolytic capacitor according to claim 1, wherein a maximum length in the length direction of the second external electrode is greater than a distance in the length direction between the first end of the first cathode and an end of a furthest cathode on a side thereof closer to the second end surface and closest to the first external electrode in the length direction among the all of the ends of the cathodes of the multiple capacitor elements in the stack on the sides thereof closer to the second end surface.

5. The electrolytic capacitor according to claim 1, wherein the second external electrode is connected to the cathodes of all of the multiple capacitor elements in the stack.

6. The electrolytic capacitor according to claim 1, wherein the second external electrode includes a resin electrode layer containing a conductive component and a resin component.

7. The electrolytic capacitor according to claim 1,
wherein the second external electrode includes a first electrode layer and a second electrode layer connected to the first electrode layer,
the first electrode layer is connected to the first cathode and the second cathode, and
in the length direction, an end of the first electrode layer on a side thereof closer to the first external electrode is closer to the first external electrode than the second end of the second cathode.

8. The electrolytic capacitor according to claim 7, wherein a maximum length in the length direction of the first electrode layer is greater than a distance in the length direction between the first end of the first cathode and an end of a furthest cathode on a side thereof closer to the second end surface and closest to the first external electrode in the length direction among the all of the ends of the cathodes of the multiple capacitor elements in the stack on the sides thereof closer to the second end surface.

9. The electrolytic capacitor according to claim 7, wherein the first electrode layer is connected to the cathodes of all of the multiple capacitor elements in the stack.

10. The electrolytic capacitor according to claim 7, wherein the second electrode layer includes a resin electrode layer containing a conductive component and a resin component.

11. The electrolytic capacitor according to claim 7, further comprising a sealing resin sealing the stack and the first electrode layer, and
wherein the first electrode layer is covered by the second electrode layer and the sealing resin.

12. The electrolytic capacitor according to claim 1, wherein at least one of the one or more first capacitor elements is adjacent to at least one of the one or more second capacitor elements in the thickness direction.

13. The electrolytic capacitor according to claim 12,
wherein the second end of the second cathode is closest to the first external electrode in the length direction among the all of the ends of the cathodes of the multiple capacitor elements in the stack on the sides thereof closer to the second end surface, and
the one or more first capacitor elements and the one or more second capacitor elements are alternately stacked in the thickness direction.

14. A method of producing an electrolytic capacitor, the method comprising:
forming a stack defining a first end surface and a second end surface opposite to each other in a length direction and including multiple capacitor elements stacked in a thickness direction perpendicular to the length direction, each capacitor element of the multiple capacitor elements including an anode having a porous portion at a surface thereof, a dielectric layer on a surface of the porous portion, and a cathode opposite to the anode via the dielectric layer, wherein the multiple capacitor elements include a first capacitor element including a first cathode having a first end that is first closest to the second end surface and is first furthest from the first end surface in the length direction among all of ends of the cathodes of the multiple capacitor elements on sides thereof closer to the second end surface, and a second capacitor element including a second cathode having a second end that is second closest to the second end surface on a side thereof closer to the second end surface in the length direction and is second furthest from the first end surface in the length direction among the all of the ends of the cathodes of the multiple capacitor elements on the sides thereof closer to the second end surface;
forming a first electrode layer on the second end surface of the stack such that the first electrode layer is connected to the first cathode and the second cathode;
forming a sealed body such that the anodes of the multiple capacitor elements are exposed at one end surface in the length direction of the sealed body and the first electrode layer is exposed at the other end surface in the length direction thereof by sealing the stack and the first electrode layer with a sealing resin;
forming a first external electrode on the one end surface of the sealed body and connected to the anode of at least one capacitor element of the multiple capacitor elements; and
forming a second electrode layer on the other end surface of the sealed body and connected to the first electrode layer to form a second external electrode.

15. The method of producing an electrolytic capacitor according to claim 14, wherein the first electrode layer is formed by immersion coating, screen printing, transfer printing, inkjet printing, dispensing, spray coating, brush coating, drop casting, electrostatic coating, plating, or sputtering.

16. The method of producing an electrolytic capacitor according to claim 15, wherein the second electrode layer is formed by immersion coating, screen printing, transfer printing, inkjet printing, dispensing, spray coating, brush coating, drop casting, electrostatic coating, plating, or sputtering.

17. The method of producing an electrolytic capacitor according to claim 14, wherein the second electrode layer is formed by immersion coating, screen printing, transfer printing, inkjet printing, dispensing, spray coating, brush coating, drop casting, electrostatic coating, plating, or sputtering.

18. The method of producing an electrolytic capacitor according to claim 14, wherein the second electrode layer is formed using a conductive paste containing a conductive component and a resin component.

* * * * *